(12) United States Patent
Bonaci et al.

(10) Patent No.: US 11,354,596 B2
(45) Date of Patent: Jun. 7, 2022

(54) MACHINE LEARNING FEATURE ENGINEERING

(71) Applicant: Kaskada, Inc., Seattle, WA (US)

(72) Inventors: Davor Bonaci, Seattle, WA (US);
Benjamin Chambers, Seattle, WA (US); Andrew Concordia, Seattle, WA (US); Emily Kruger, Seattle, WA (US); Ryan Michael, Seattle, WA (US)

(73) Assignee: KASKADA, INC., Seattle, WA (US)

( * ) Notice: Subject to any disclaimer, the term of this patent is extended or adjusted under 35 U.S.C. 154(b) by 0 days.

(21) Appl. No.: 16/877,407

(22) Filed: May 18, 2020

(65) Prior Publication Data
US 2021/0241171 A1 Aug. 5, 2021

Related U.S. Application Data

(60) Provisional application No. 62/969,639, filed on Feb. 3, 2020.

(51) Int. Cl.
*G06N 20/00* (2019.01)
*G06F 16/28* (2019.01)
*G06N 5/02* (2006.01)
*G06N 5/04* (2006.01)

(52) U.S. Cl.
CPC ........... *G06N 20/00* (2019.01); *G06F 16/284* (2019.01); *G06N 5/02* (2013.01); *G06N 5/04* (2013.01)

(58) Field of Classification Search
CPC . G06N 20/00; G06N 5/02; G06N 5/04; G06F 16/284
USPC ........................................................ 706/12
See application file for complete search history.

(56) References Cited

U.S. PATENT DOCUMENTS

| 10,649,794 | B2 | 5/2020 | Moon et al. | |
|---|---|---|---|---|
| 10,803,187 | B2 | 10/2020 | Viswanathan et al. | |
| 2015/0269495 | A1* | 9/2015 | Dalessandro | G06N 20/00 706/12 |
| 2016/0078362 | A1* | 3/2016 | Christodorescu | G06F 21/554 706/12 |

(Continued)

OTHER PUBLICATIONS

Kenda, "Streaming Data Fusion for the Internet of Things", Sensors, 2019. (Year: 2019).*
Smith, "FeatureHub: Towards collaborative data science", 2017 International Conference on Data Science and Advanced Analytics. (Year: 2017).*

(Continued)

*Primary Examiner* — Dave Misir
(74) *Attorney, Agent, or Firm* — BakerHostetler

(57) ABSTRACT

Machine learning feature engineering systems and methods comprise an event ingestion module that receives event data associated with entities. The ingestion module determines which entities are associated with events of the event data. The ingestion module stores the events, grouped by associated entity, in a related event store. A user defines features associated with the entities via an API and/or a feature studio. A feature computation layer determines values for the features based on the grouped events stored to the related event store. The feature computation layer stores the computed feature values and timestamps to a feature store. When new data is received, the feature computation layer computes one or more of the feature values for different times based on the timestamps. Feature vectors are generated using the computed feature values and output to the user via the API and/or feature studio.

17 Claims, 8 Drawing Sheets

(56) References Cited

U.S. PATENT DOCUMENTS

| | | | |
|---|---|---|---|
| 2017/0091673 A1* | 3/2017 | Gupta | G06N 5/022 |
| 2017/0286843 A1* | 10/2017 | Yamamoto | G16H 50/20 |
| 2018/0067732 A1* | 3/2018 | Seetharaman | G06F 3/0428 |
| 2018/0248904 A1* | 8/2018 | Villella | G06N 3/088 |
| 2018/0260728 A1* | 9/2018 | Mathew | G06F 16/285 |
| 2019/0251467 A1* | 8/2019 | Lokare | G06F 17/16 |
| 2019/0272478 A1* | 9/2019 | Fuchs | G06F 16/35 |
| 2019/0286746 A1* | 9/2019 | Li | G06N 5/003 |
| 2019/0325258 A1* | 10/2019 | Stein | G06F 16/2456 |
| 2019/0347578 A1* | 11/2019 | Bolding | H04L 63/20 |
| 2019/0378210 A1* | 12/2019 | Merrill | G06N 3/084 |
| 2020/0005045 A1* | 1/2020 | Lloyd, II | G06K 9/00993 |
| 2020/0090056 A1* | 3/2020 | Singhal | G06N 5/04 |
| 2020/0285997 A1 | 9/2020 | Bhattacharyya et al. | |

OTHER PUBLICATIONS

Kanter, "Deep Feature Synthesis: Towards Automating Data Science Endeavors", IEEE, 2015. (Year: 2015).*

Kenda, "Streaming Data Fusion for the Internet of Things", Sensors, 2019. (Previously supplied). (Year: 2019).*

Smith, "FeatureHub: Towards collaborative data science", 2017 International Conference on Data Science and Advanced Analytics. (Previously supplied). (Year: 2017).*

Kanter, "Deep Feature Synthesis: Towards Automating Data Science Endeavors", IEEE, 2015. (Previously supplied). (Year: 2015).*

International Patent Application No. PCT/US2021/016445; Int'l Search Report and the Written Opinion; dated Mar. 3, 2021; 11 pages.

* cited by examiner

MACHINE LEARNING FEATURE ENGINEERING

CROSS-REFERENCE

This application claims priority to provisional application 62/969,639 which is hereby incorporated by reference in its entirety.

BACKGROUND

Machine learning algorithms build a mathematical model based on sample data, known as "training data", in order to make predictions or decisions without being explicitly programmed to perform the task. In machine learning, a feature is an observable property of an object in a dataset. A feature vector is a list of features of an object in a dataset. The feature vector is generated from information about the object and events related to the object.

Feature vectors are used in the training stage, the validation stage, and the application stage of machine learning. In the training stage, a model is produced using a plurality of feature vectors representing training data. The plurality of feature vectors, each representing a training example, is fed to a machine learning algorithm to train the model. In the validation stage, feature vectors from the validation set, generally distinct from the training examples, are fed to the model to produce a prediction and/or to evaluate accuracy. In the application stage, a feature vector (e.g., a feature vector from the training set or validation set or a different feature vector) is fed to the model to produce a prediction.

SUMMARY

A machine learning feature engineering system is configured to receive event data associated with a plurality of entities from one or more data sources, such as an offline source and/or a streaming source. The system groups the events by associated entity and store the grouped events to a related event store. Based on receiving an indication of one or more features associated with the entities from a user, the system computes values for the features using the events stored to the related event store. The system stores the computed feature values in a feature store and updates the feature values based on receiving new event data or new feature configurations. The system uses a timestamp convention to avoid reprocessing events and/or features. By maintaining a related event store with events that are continuously updated and a feature store with feature values that are computed using minimal processing based on the timestamp convention and up-to-date events in the related event store, the system efficiently responds to user queries by generating feature vectors for any entity.

BRIEF DESCRIPTION OF THE DRAWINGS

The following drawings show generally, by way of example, but not by way of limitation, various examples discussed in the present disclosure. In the drawings.

DETAILED DESCRIPTION

Figure 1:
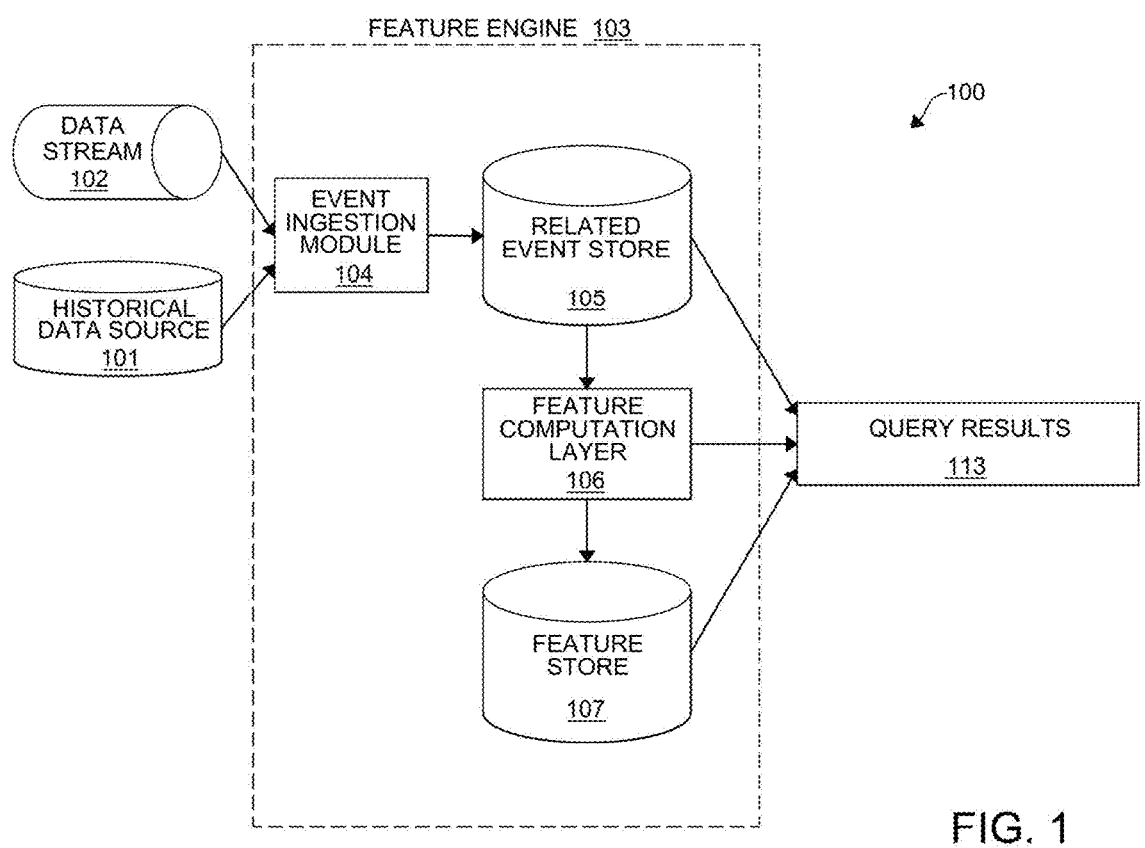
FIG. 1 shows example feature engineering system ingesting data and outputting query results.

FIG. 1 shows an example feature engineering system 100. Feature engineering system 100 ingests data from data sources 101, 102, stores the data, and uses the data for computation of features. Ingestion and/or storing of the data continuously and/or as new data becomes available allows for up-to-date feature computations. A user can query feature engineering system 100 at any time to receive features based on the most current ingested data or data from a particular time. In machine learning and pattern recognition, a feature is an individual measurable property or characteristic of a phenomenon, object, or entity being observed. Choosing informative, discriminating, and independent features is an important step for effective algorithms in pattern recognition, classification and regression. Features can be numeric, such as values or counts. Features can be structural, such as strings and graphs, like those used in syntactic pattern recognition.

In an embodiment, feature engineering system 100 is configured to efficiently provide and/or generate features for a user for use in the training or application stage of machine learning. In the training stage, a model is produced by providing a machine learning algorithm with training data, such as several training examples. Each training example includes properties, such as features. The properties may include a desired result, such as in supervised machine learning. A set of features for a specific instance or entity is known as a feature vector. The training example may include several feature vectors, which may be organized in columns with the same properties described for each instance or entity. In supervised machine learning, a model may be produced that generates results or predictions for an entity based on a feature vector that is input and associated with that entity. The algorithm produces a model that is configured to minimize the error of results or predictions made using the training data.

In the application stage, a model may be used to generate results or make predictions and may be tested or evaluated based on the generated results or predictions. Applying the model may involve computing a feature vector using the same computations that were used in training of the model, but for an instance that was not present in the training example. The model may be evaluated based on the accuracy or error of the data in the generated feature vector.

System 100 is configured to ingest event data from one or more sources 101, 102 of data. In some configurations, a data source includes historical data, e.g., from historical data source 101. In that case, the data includes data that was received and/or stored within a historic time period, i.e. not real-time. The historical data is typically indicative of events that occurred within a previous time period. For example, the historic time period may be a prior year or a prior two years, e.g., relative to a current time, etc. Historical data source 101 may be stored in and/or retrieved from one or more files, one or more databases, an offline source, and the like or may be streamed from an external source.

In another aspect of example feature engineering system 100, the data source includes a stream of data 102, e.g., indicative of events that occur in real-time. For example, stream of data 102 may be sent and/or received contemporaneous with and/or in response to events occurring. In an embodiment, data stream 102 includes an online source, for example, an event stream that is transmitted over a network such as the Internet. Data stream 102 may come from a server and/or another computing device that collects, processes, and transmits the data and which may be external to the feature engineering system.

The data from sources 101, 102 may be raw data. The raw data may be unprocessed and/or arbitrarily structured. In an embodiment, the data from sources 101, 102 may be organized in fields and/or tables, such as by the system 100. If source 101, 102 is a database, e.g., a relational database, it may have a schema. The schema is a system that defines the fields, the tables, relationships, and/or sequences of the data in the database. The schema can be provided to feature engineering system 100 to provide a definition of the data. The fields can have one or more user-defined labels. The labels can be provided to feature engineering system 100 to provide a definition of the data.

In an embodiment, the ingested data is indicative of one or more events. The ingested data is indicative of one or more entities associated with one or more of the events. An example of an event may include a browsing event or a watch event, e.g., a click stream. An example of the entity may include a user or a product, etc.

In an embodiment, system 100 includes a feature engine 103. Feature engine 103 is operable on one or more computing nodes which may be servers, virtual machines, or other computing devices. The computing devices may be a distributed computing network, such as a cloud computing system or provider network.

According to an embodiment, feature engine 103 includes an event ingestion module 104. Event ingestion module 104 is configured to ingest the data from one or more of sources of data 101, 102. For example, event ingestion module 104 may import data from historical data source 101, such as to perform a set-up and/or bootstrap process, and also may be configured to receive data from stream of data 102 continuously or in real-time.

According to another aspect of the disclosed subject matter, event ingestion module 104 is configured to assign events arrival timestamps, such as based on ingesting the data indicating the events. Additionally, event ingestion module 104 may be configured to assign the arrival timestamps using a distributed timestamp assignment algorithm. In an embodiment, the distributed timestamp algorithm assigns timestamps comprising a plurality of parts. For example, a part of a timestamp may have a time component. According to an aspect, the time component indicates an approximate comparison between machines, such as an approximate comparison between a time that data source 101, 102 sent the data and a time that feature engine 103 ingested the data. According to another aspect, the timestamp may have a unique machine identification (ID) that prevents duplicate timestamps among other things. According to yet another aspect, the timestamp has a sequence number. An aspect of the sequence number allows multiple timestamps to be generated. The timestamps may be used to indicate a total order across all events. If events from data stream 102 are a partitioned stream, e.g., a Kafka stream, a Kinesis stream, etc., the timestamps indicate a total order across all events and indicate an order of the events within each partition. The timestamps facilitate approximate comparisons between events from different partitions.

In some embodiments, the ingested data includes an indication of an occurrence time associated with an event. The occurrence time is a time that the event occurred. The occurrence time may be different than the time component and/or an arrival time associated with the event and/or the ingested data.

According to an aspect, feature engine 103 is configured to determine an entity associated with an event in the ingested data. For example, feature engine 103 may determine the entity associated with the event using the schema, the fields, and/or the labels of the data. As another example, the ingested data may indicate the entity, such as by a name, number, or other identifier. Feature engine 103 may also be configured to group events in the ingested data by entity.

In embodiments, feature engine 103 is configured to de-duplicate events. If a duplicate of same events are received, ingesting the data may include de-duplicating the events. Techniques for de-duplicating the events may include using unique identifiers associated with events to track unique identifiers that have been ingested. If an event arrives having a unique identifier that is a duplicate of a unique identifier of an event that has already been ingested, the arriving event may be ignored.

In embodiments, feature engine 103 is configured to de-normalize events. In particular, events may be associated with more than one entity. De-normalizing an event includes storing a copy of an event for each entity associated with the event. Notably, this is different from de-duplicating events in that de-duplicating recognizes and removes duplicates from the same set of data so that the feature engine does not double count events, for example.

In embodiments, feature engine 103 is configured to filter the data. Filtering the data includes such actions as determining optimal events and/or events that may be used to determine a feature. Feature engine 103 may be configured to continuously group, de-normalize, and/or filter data as it is received, such as from data stream 102.

In embodiments, feature engine 103 includes a related event store 105. In that instance, feature engine 103 is configured to store an indication of an entity associated with an event in related event store 105. Feature engine 103 is configured to store groupings of events associated with common entities in related event store 105. Feature engine 103 is configured to continuously store and/or update associated data stored to related event store 105 as data is ingested, such as from data stream 102. Related event store 105 facilitates efficient, on-demand access to results 113 to a user query. Query results 113 may include events associated with specific entities. Query results 113 may include statistics across a plurality of entities.

Feature engine 103 includes a feature computation layer 106. Feature computation layer 106 is configured to determine one or more features associated with an entity. In embodiments, the features to be determined are defined by a user. In embodiments, feature computation layer 106 is configured to determine a feature using a feature configuration for the feature. In embodiments, the feature configuration is received from a user, such as from a feature studio as described more fully herein.

In embodiments, feature computation layer 106 is configured to determine the features using the raw data and/or events stored to related event store 105. The feature computation layer 106 may be configured to determine the features by applying a variety of numerical processes to the data, such as arithmetic operations, aggregations, and various other techniques. Determination of the features may be an experimental process. For example, the feature computation layer 106 may determine which features would be useful for a model. A useful feature may be one that is informative. A feature may be informative if it is useful to the task that a model is being trained for and that correlates with the goal of the model. A feature may be useful if it is discriminating. A discriminating feature may have different values for different goals. A useful feature may be a feature that is independent. An independent feature may not be related to or depend on other features. A useful feature may be a feature that does not suffer from leakage. A feature that does not suffer from leakage is one that does not depend on information that is only available from (or after) a target event.

In an embodiment, a user of the system 100 may determine useful features for a model by evaluating the features using both numerical methods and attempts to train a model using the features. By attempting to train the model using the features, the user may see if the model trained using the features of interest has less error, such as by testing the model using a validation set, as compared to the model trained with different features.

Selection of useful values for a model may reduce a number of training examples needed to train the model. When more features are used to train and/or use a model, exponentially more training examples are needed to train the model. Determining a good combination of features for a model involves balancing the usefulness of the information captured by each feature with the additional need for training data that the feature imposes. Therefore, determining useful features enables production of a good model with a minimal number of training examples needed to produce the model.

According to an aspect, feature computation layer 106 is configured to compute features by performing aggregations across events associated with an entity. Computing features from large amounts of raw data is a technically complicated process, as it may involve computing aggregate properties across all of the raw data.

According to an aspect, feature computation layer 106 is configured to continuously determine features, such as when feature engine 103 ingests new data from data stream 102. Determining features may include updating features and/or feature vectors, such as based on ingesting new data from data stream 102. The feature computation layer 106 may be configured to compute the features and/or update the features at a speed that supports iteration and exploration of potential features to determine good features for a model. The continuous computation of features again highlights the importance of determining good features. As events continue to be produced and/or ingested the size of the raw data set (e.g., saved to the event store 105) increases over time. As a result of the system's 100 feature determination and updating function, the work needed to compute features does not increase over time and/or as the size of the raw data set increases.

Determining features may include accessing information outside related event store 105, e.g., by performing lookups from external databases that haven't been ingested by feature engineering system 100. According to another aspect, feature computation layer 106 is configured to determine and/or update features in response to user queries.

The feature engineering system 100 may simplify collaboration in feature generation and/or selection. Features are often defined by users, such as data scientists. A company may have multiple data scientists producing features for one or more models. The data scientists may need to use different tools to access different kinds of raw data and/or events, further complicating the process of producing features. Collaboration on features produced in ad-hoc and varied ways makes it difficult to share features between users and/or projects. In addition, the techniques for producing features may vary based on the data size and the need for producing the feature vectors "in a production environment." This may lead to the need to implement features multiple times for different situations. However, the feature engineering system 100 may address these shortcomings by ingesting and/or saving raw data and/or events from a variety of sources and making the features available to users in different locations and/or using different devices, such as via the feature studio described further herein.

In an embodiment, feature computation layer 106 is configured to compute feature vectors. A feature vector is a list of features of an entity. The feature computation layer 106 may be configured to compute and/or update feature vectors as events are ingested by the feature engine 103. The feature computation layer 106 may be configured to compute and/or update feature vectors in response to user queries.

In an embodiment, feature engine 103 includes a feature store 107. Feature computation layer 106 may store the determined features and/or generated feature vectors to feature store 107. Feature store 107 makes deployed features available for users. According to an aspect, feature computation layer 106 keeps feature store 107 up-to-date, such as by computing and updating values of features when new events are received and/or when a request is received from a user. Based on the features stored to feature store 107, feature computation layer 106 may avoid recomputing features using the same events. For example, if feature computation layer 106 has determined features using events up to arrival time x, feature computation layer 106 determines features using events up to arrival time x+n by only considering events that arrived after arrival time x and before arrival time x+n.

According to an aspect, feature computation layer 106 updates the features and/or save the new features to feature store 107. As a result, feature store 107 is configured to make up-to-date query results 113 available on-demand. Query results 113 may include features and/or feature vectors, such as across a plurality of entities and/or associated with a specific entity. Query results 113 may include aggregate statistics across a plurality of entities.

Figure 2:
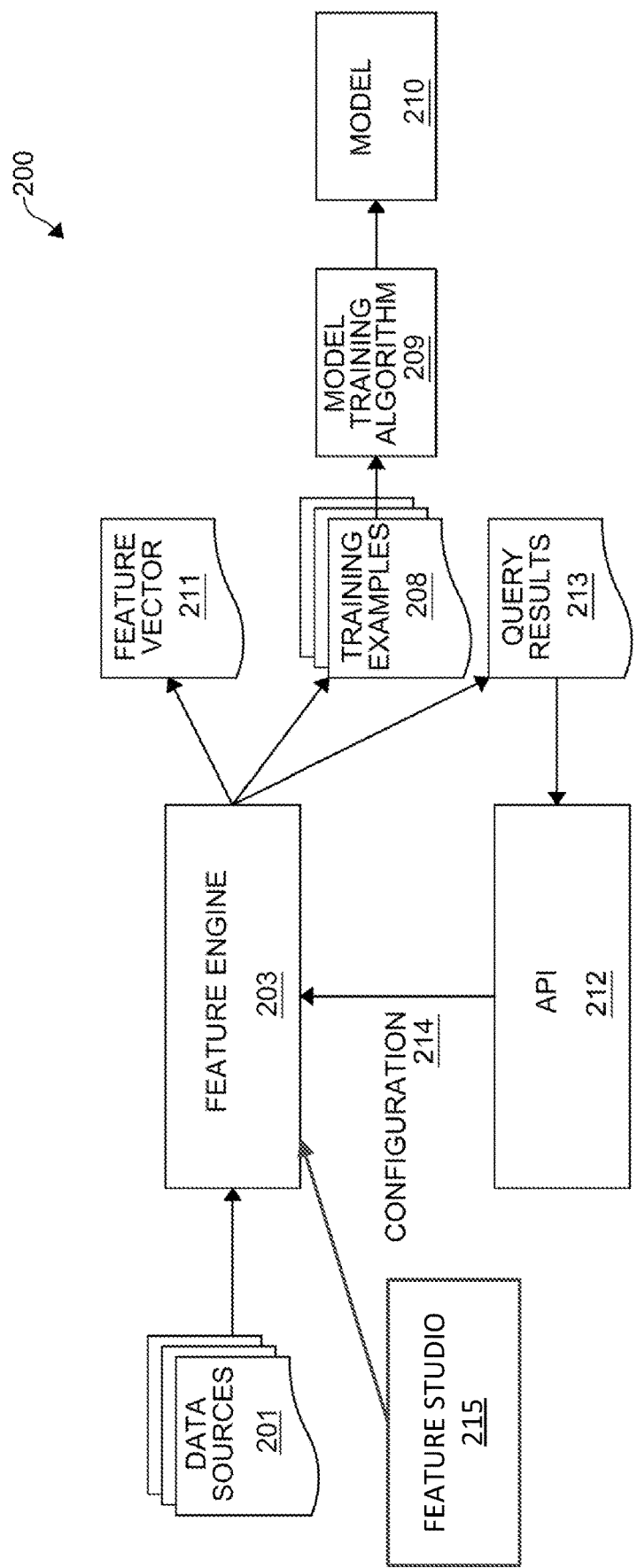
FIG. 2 shows an example feature engineering system in training stage and application stage.

FIG. 2 shows an example feature engineering system 200. System 200 includes one or more data sources 201. Data sources 201 may be similar to data sources 101, 102 in FIG. 1. Data sources 201 may include sources of historical data, data streams, or a combination thereof.

System 200 includes a feature engine 203. Feature engine 203 may be similar to feature engine 103 in FIG. 1. Feature engine 203 may receive data associated with a plurality of entities from data sources 201 and/or a user, such as from a feature studio 215 via an API 212. Feature studio 215 allows users to define features that feature engine 203 will determine using the ingested data. A feature can be defined using one or more formulas, such as formulas. For example, if "Purchases.amount" is amounts of purchases of a user, a user may define a feature "total purchases of a user" with the formula "SUM(Purchases.amount)," which adds up the amounts of the user's purchases.

Feature engine 203 has functionalities for both the training stage and the application stage of a machine learning process. For the training stage, feature engine 203 is configured to generate training examples 208 to produce a machine learning model. Training examples 208 are generated using the ingested data. In an embodiment, training examples 208 are feature vectors. Training examples 208 are output to the user, such as via API 212 and/or feature studio

215. The user can feed training examples 208 to a model training algorithm 209 to produce a machine learning model 210. Model 210 may be used to make predictions using new and/or different data, e.g., data different from the data of training examples 208.

For the application stage, feature engine 203 is configured to generate feature vectors 211, which may be fed to machine learning model 210. In an embodiment, a user requests a feature vector 211 for a specific entity via feature studio 215 and/or via API 212. In response to receiving the request for feature vector 211, feature engine 203 generates and/or output feature vector 211, such as via feature studio 215 and/or via API 212.

Generating feature vector 211 may include determining one or more features associated with the entity that make up the feature vector using the ingested data. If the features have already been determined, e.g., before receiving the request, and have been stored, such as to feature store 107 in FIG. 1, feature engine 203 retrieves the stored features associated with the entity and uses the previously determined features and the newly arriving events to generate updated values of the features. According to an aspect, feature engine 203 determines features using a configuration 214. Configuration 214 may be an algorithm. Configuration 214 may be received from the user, such as via feature studio 215 and/or API 212.

After receiving feature vector 211 from feature engine 203, the user may feed feature vector 211 to machine learning model 210. Machine learning model 210 is configured to use feature vector 211 to make predictions and/or determine information associated with the entity. Machine learning model 210 is configured to output the predictions and/or information via feature studio 215 and/or API 212.

As an illustrative example, during the training stage, feature engine 203 receives data associated with a plurality of entities comprising one thousand people. The data indicates movies that the people have watched and movies that the people want to watch. Feature engine 203 may generate training examples 208. The user feeds training examples 208 to a training algorithm 209 to produce a machine learning model 210. Machine learning model 210 represents what movies people should watch based on their movie-viewing history.

During the application stage, the user requests a feature vector 211 for an entity, such as a particular person via API 212 and/or feature studio 215. Feature engine 203 generates a feature vector 211 comprising a list of movies that the person has watched. Feature engine 203 outputs the feature vector 211 to the user via API 212 and/or feature studio 215. The user feeds feature vector 211 to machine learning model 210. Machine learning model 210 predicts one or more movies that the person should watch. The user may use the prediction to provide the person with movie suggestions or for targeted advertising.

In addition to feature vector 211, feature engine 203 is configured to output other query results 213 in response to a user query. For example, other query results 213 may include feature values, statistics, descriptive information, a graph, e.g., a histogram, and/or events associated with one or more entities. According to an aspect, query results 213 are associated with a time specified by the user. According to another aspect, query results 113 are computed using all feature values, a sample of feature values, or aggregated feature values.

In an embodiment, the user interacts with feature engine 203 to update the feature value and/or feature vector 211 computations, such as via feature studio 215. For example, the user may indicate a new configuration 214 that should be applied to compute feature values and/or feature vectors 211. As another example, the user may indicate that particular features are no longer necessary, e.g., should not be computed and/or should not be included in feature vectors or computations of query results 213.

Figure 3:
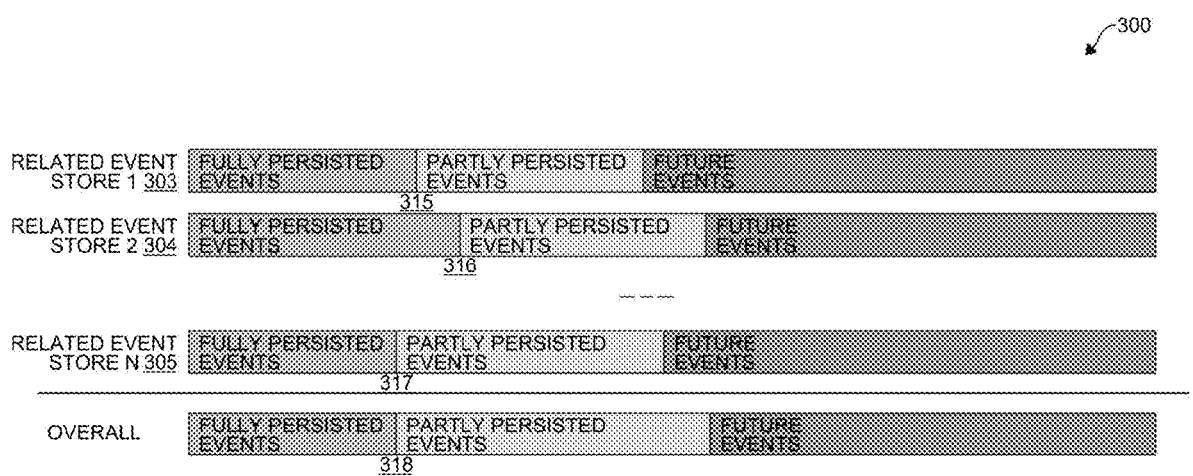
FIG. 3 shows example event data being persisted in related event stores.

FIG. 3 shows example event data 300. In an embodiment, event data 300 is stored in a plurality of related event stores 303, 304, 305. Related event stores 303, 304, 305 may be similar to related event store 105 in FIG. 1. One or more computing devices, e.g., feature engine 103 in FIG. 1, event ingestion module 104 in FIG. 1, and/or feature engine 203 in FIG. 2 may persist, e.g., store, event data 300 to related event stores 303, 304, 305.

According to an aspect, event data 300 is persisted to related event stores 303, 304, 305 at different rates, such as based on network latency and/or processing of the computing devices. As shown in FIG. 3, the rate of event data 300 that has fully persisted, partly persisted, and is being received ("future events") may vary across related event stores 303, 304, 305. Fully persisted events are events that have been persisted to event stores 303, 304, 305. Partly persisted events are events that have been sent to event stores 303, 304, 305, but have not been received, data that is still being ingested by a computing device, and/or data that has been received by related event stores 303, 304, 305 but is not yet persisted. Future events are events that have not been sent to related event stores 303, 304, 305.

In an embodiment, in order to reach consensus on timing of events from event data 300, despite network and/or processing delays, the computing devices store the events to related event stores 303, 304, 305 with associated timestamps. According to an aspect, the timestamps are multipart timestamps, such as the timestamps described in reference to FIG. 2. According to another aspect, the timestamps include arrival timestamps that indicate times that the events were received by the computing devices. The timestamps may be assigned after events are received and before they are persisted. Timestamps may be assigned as soon as possible after arrival of events to ensure that the timestamps accurately indicate the arrival order of events at the computing devices. The timestamps may be similar to the Twitter Snowflake ID and/or the Sonyflake.

In an embodiment, based on the arrival timestamps, the system can avoid recomputing feature values. A feature computation layer, such as feature computation layer 106 in FIG. 1, determines that a feature value with a known arrival time will not change by determining that no events with earlier arrival times will be persisted. Determining that no events with earlier arrival times will be persisted may be performed by causing related event stores 303, 304, 305 to report minimum local arrival times 315, 316, 317 of any not-yet-persisted events and remembering previously reported values of minimum local arrival time 315, 316, 317 of any not-yet-persisted event. The minimum time of minimum local arrival times 315, 316, 327 marks the complete point 318, a time prior to which new data affecting the computed feature values will not be received. The computation layer remembers features that are computed using events with timestamps at and/or prior to complete point 318. Avoiding recomputing of feature values increases the efficiency of feature computation.

According to an aspect, computed features may be stored with an indication of the times at which they were computed. When new events are received, new feature values are computed using a feature value with the latest computation time and/or a feature value with the latest events and the new events.

New events may be received in an order that does not correspond to their occurrence times. In this case, in order to update feature values, the occurrence times of events that arrived after the latest feature value computation time are determined. The minimum occurrence time of the determined occurrence times represents an oldest event of the newly received events. The computed feature value with the largest computation time that is less than or equal to the minimum occurrence time is identified and represents the real point at which to start feature computation. All of the events that occurred after the real point are re-processed. According to an aspect, ordered aggregations are performed using this method applied across feature values and events associated with a specific entity.

According to an aspect of the disclosed subject matter, the arrival timestamps facilitate deploying configuration updates without causing a shut-down of the system. Once a configuration update is deployed, events that persisted after the configuration update was deployed, e.g., have a timestamp later than the deployment time, will be processed using the latest configuration. Events that persisted when and/or prior to the configuration update being deployed, e.g., have a timestamp at or earlier than the deployment time, may have been ingested using an older configuration. Therefore, the events that persisted when and/or prior to the configuration update being deployed are re-processed using the latest configuration.

To determine which events should be re-processed, related event stores 303, 304, 305 reports the arrival time that the latest configuration went into effect. The maximum time of the arrival times serves as a cutoff arrival time. Events having timestamps after the cutoff arrival time are processed with the new configuration. Events having timestamps before this time are not re-processed. Not re-processing events having timestamps before the cutoff arrival time saves time and improves system efficiency.

Figure 4:
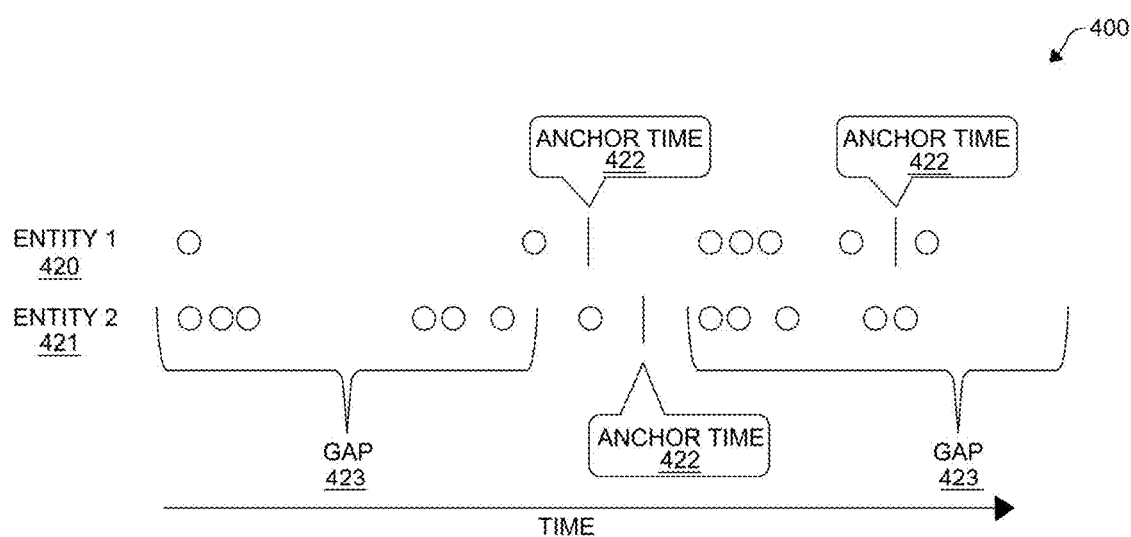
FIG. 4 shows example event data over time.

FIG. 4 shows example events 400 for two entities 420, 421 over time. Events 400 may be events 400 in a dataset ingested by a feature engine, e.g., feature engine 103 in FIG. 1, feature engine 203 in FIG. 2, from a data source, e.g., data sources 101, 102 in FIG. 1, data sources 201 in FIG. 2. According to an aspect, values of features may be determined and/or sampled at arbitrary points in times, anchor times 422, over a continuous domain. The feature values may be determined using events 400 associated with the entity having arrival or occurrence times before anchor time 422, at anchor time 422, or after anchor time 422. The feature values may be determined using events 400 having arrival or occurrence times that are some "gap" 423 before or after the anchor time. Gap 423 may be determined by the user, by a feature computation layer, e.g., feature computation layer 106 in FIG. 1, or based on a feature configuration.

As an illustrative example, events 400 are user activity on a subscription-based service. A user wants to develop a model that predicts a likelihood of users cancelling their subscription based on their activity. To generate training examples, anchor times 422 are set as times at which users cancelled their subscriptions for the service. Feature values are determined using events 400 within a gap 423 of 7-days from anchor events 422. The feature values may be used to generate the training examples.

Anchors time 422 may vary depending on whether the feature to be determined is a target feature or a predictor feature. A target feature is a past or present event. For a target feature, feature values are determined using events 400 after a selected anchor time 422. A predictor feature is a future event. For a predictor feature, feature values are determined using events 400 prior to selected anchor time 422. Determining predictor features using events 400 prior to selected anchor time 422 prevents using data to train a model that includes information about the future, e.g., "leakage". Leakage occurs when information that is only available after the event to be predicted has happened are used as the prediction.

As an illustrative example, there is a website that has functionalities that are only available to paid users. A model is developed to determine which users are likely to become paid users. However, if the model is trained using information about paid users using the paid functionalities, leakage will result. As a consequence of the leakage, the model can determine that users using the paid functionalities are likely to be paid users, but cannot predict which users are likely to become paid users.

To avoid leakage, an anchor time T is selected at a time at which a user becomes a paid user. By computing feature values using events prior to the anchor time T, leakage is prevented. Computation of feature values, such as a number of times that a user used paid functionalities before they became a paid user, returns a value of 0 because the user cannot use paid functionalities, yet.

Also, leakage may happen when events occurring within a relatively small timeframe before a target event are used. An example target event is a user making a purchase on a website. Users who are likely to buy items on the website may be likely to go to a "check-out" page of the website. Users may often visit the "check-out" page shortly before making a purchase. Therefore, a time of the visiting of the "check-out" page is selected as the anchor time, e.g., instead of using a time of the purchase as the anchor time. Next, a gap 423 of one hour is determined. Only events outside an hour from the anchor time are used to compute features. As such, gap 423 prevents events that commonly lead up to the visiting of the "check out" page from being used in the computation of predictor features, thus preventing leakage.

Anchor time 422 may be determined in any of several ways. For example, anchor time 422 may be input by a user, such as via API 212 and/or feature studio 215 in FIG. 2. As another example, anchor time 422 may be determined based on a maximum number of anchor times 422. The maximum number of anchor times 422 may be input by a user or determined based on a desired limited number of training examples in a dataset. As another example, anchor times 422 may be determined based on a minimum time interval between anchor times 422 for an entity or input by a user. Anchor times 422 may be defined relative to the occurrence time of events 400 associated with an entity. To illustrate, if events 400 in a dataset are patient LDL cholesterol levels, anchor times 422 may be defined as two months prior to events comprising cholesterol levels over a threshold level, such as 160 md/dL. As another example, the user may define anchor times 422 as conditioned on properties of events 400 or feature values. To illustrate, if events 400 in a dataset are purchases, an anchor time 422 can be conditioned on a cost of a purchase being above a threshold amount, such as $2,000.

Additionally, anchor times 422 may be randomly selected. The likelihood of selecting an anchor time 422 over a particular time interval may depend on feature values over the interval. Anchor times 422 may be selected to yield desired statistical properties in the resulting feature values. For example, anchor times 422 corresponding to the occurrence of an event 400 may be balanced with anchor times 422 corresponding to non-occurrence of the event 400.

As an illustrative example, a model is developed to predict whether customers will sign-up for a service. If all of the training data includes anchor times 422 with a target feature value indicating that a customer signed-up for the service, the model may predict that everyone signs-up, while still being accurate based on the training data. Instead, customers and anchor times are selected such that 50% of the examples include a customer signing up and 50% of the examples include a customer not signing up. The examples of a customer not signing up are data from customers who have never signed up. The examples of a customer signing up are data from customers who have signed up and an anchor time is a time being before their signing up. A rule is created that each customer may only be used for training once.

Figure 5:
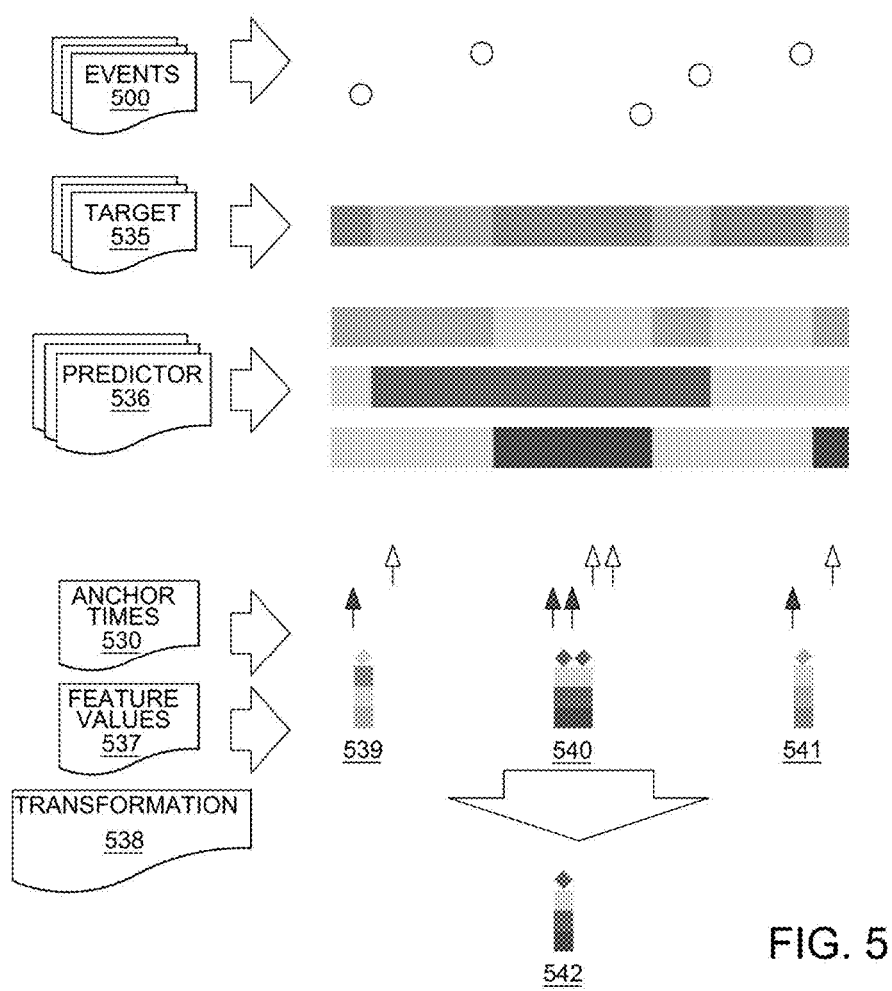
FIG. 5 shows example event data, anchor times, feature values, and transformations used to compute features.

FIG. 5 shows example events 500 for an entity over time. Anchor times 530 are determined based on whether the features to be computed are target features 535 or predictor features 536. Also, time gaps from anchor times 530 are determined based on whether the features to be computed are target features 535 or predictor features 536. If the features are target features 535, gap times prior to anchor times 530 are determined. If the features are predictor features 536, gap times after anchor times 530 are determined.

Based on selected anchor times, a set of feature values 537 is computed for an associated entity or subset of all possible entities. Feature values 537 may be exported to generate training examples and to train models. A final transformation 538, such as a log transform, a statistical transformation, and/or a Box-Cox transformation is performed on feature values 537. For example, maximum 539, minimum 540, and mean 541 values of a feature 537 are used to scale feature values 537 to a fixed range.

In an embodiment, information computed to apply final transformation 538 is stored, such as by feature engine 103 in FIG. 1 or feature engine 203 in FIG. 2. A user may retrieve the stored information to apply the same transformation 538 in the future, such as when making predictions with a trained model. As a result, the system ensures that the values used for training are computed and transformed in the same way as values that are used for application.

In an embodiment, feature values 542 with the final transformations applied are stored, such as by feature engine 103 in FIG. 1 or feature engine 203 in FIG. 2, to a feature store, such as feature store 107 in FIG. 1. As a result, computed features 542 are readily available for quick model application. A user who wants to use a model trained on a particular exported dataset may efficiently retrieve stored pre-computed values 542.

Figure 6:
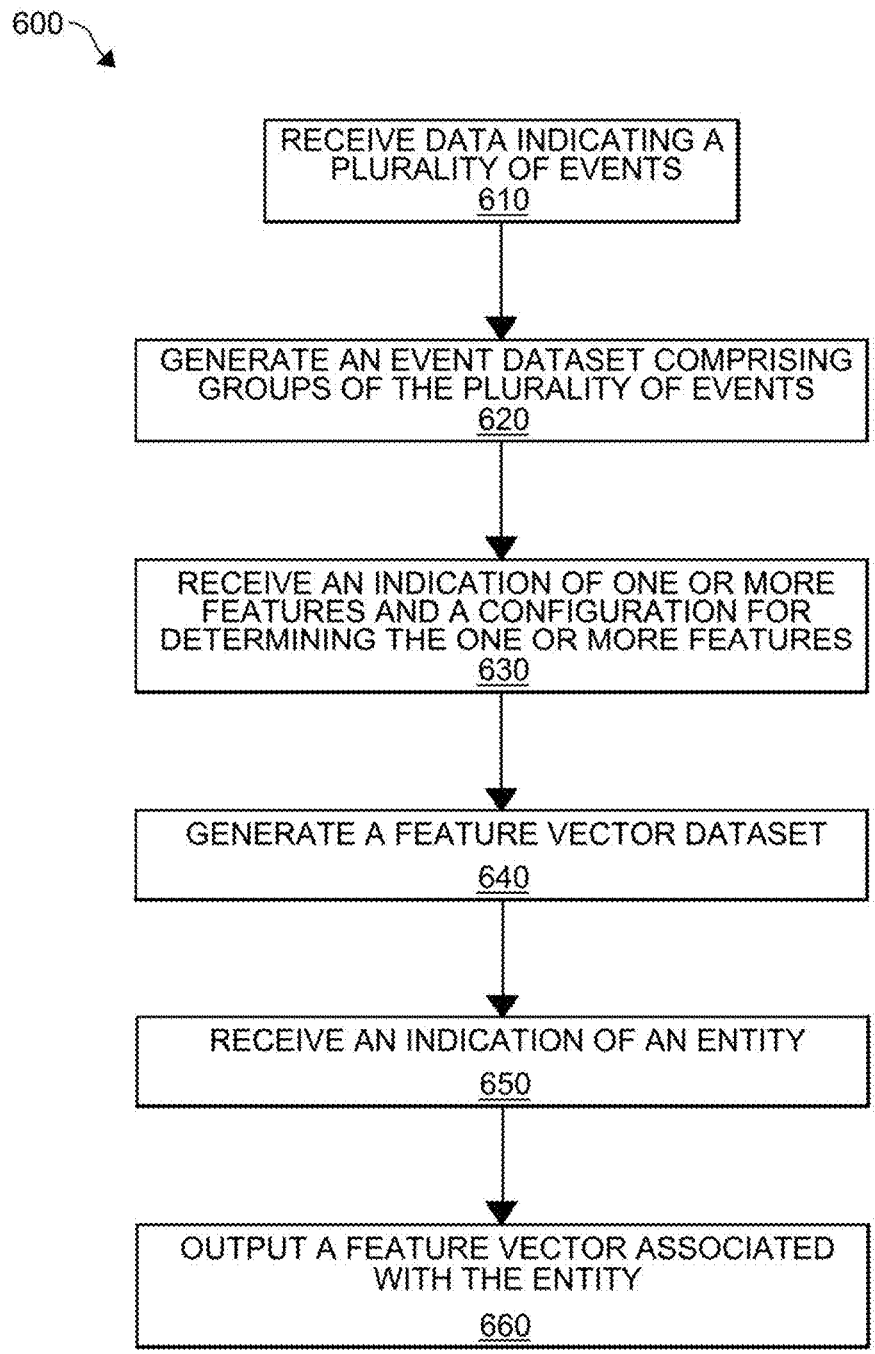
FIG. 6 shows an example feature engineering method.

FIG. 6 shows an example feature engineering method 600. At step 610, data is received, e.g., ingested, from a data source by an event ingestion module of a feature engineering system, e.g., event ingestion module 104 in FIG. 1. The ingested data indicates a plurality of events, e.g., live events, historical events, historical events republished to a stream, etc. The events are associated with one or more entities, e.g., users, products, etc. The data is filtered and/or denormalized.

At step 620, an event dataset is generated. The event dataset includes groups of the events associated with entities. The event dataset is stored to a related event store, e.g., related event store 105 in FIG. 1.

In an embodiment, the event dataset includes a plurality of timestamps associated with the events. The timestamps each include a time component. The time component may be a time that the event occurred or a time that the data was ingested and/or received, such as by the feature engineering system. The timestamps each include a unique machine identifier. The unique machine identifier is an identifier associated with a machine that sent the data, on which the event occurred, or that ingested/received the data. Each of the timestamps includes a sequence number. The sequence number may be associated with an order of packet in which the data was received or the events occurred.

At step 630, an indication of one or more features is received. The one or more features is associated with the plurality of entities. An indication of the one or more features is received via a user interface, e.g., feature studio 215 in FIG. 2. A configuration is received, such as via the user interface. The configuration is a formula for computing the one or more features.

A value of a feature is determined for an entity using event data associated with the entity. The event data is retrieved from the related event store. The value is determined by using the configuration.

In an embodiment, the value of the feature is determined using events before or after an anchor time and/or the timestamps. The anchor time may be determined in any of a variety of ways. The anchor time may be indicated by a user, such as via the user interface. The anchor time may be determined by the feature engine. The anchor time may be randomly determined. The anchor time may be determined based on whether the features are predictor features or target features. The anchor time may be determined based on receiving an indication of a number of feature vectors associated with an entity, a number of anchor times per entity, a minimum time interval between anchor times associated with the entity, a time in relation to an occurrence time of an event, or a condition associated with a property of an event or a feature value. The anchor time may be determined to ensure a statistical property associated with the values of the one or more features.

At step 640, a feature vector dataset is generated. The feature vector dataset includes a plurality of feature vectors associated with the plurality of entities. The plurality of feature vectors may include lists of values of the one or more features. The feature values and/or the feature vectors are stored to a feature store, e.g., feature store 107 in FIG. 1. The feature values and/or the feature vectors may be exported. According to an aspect, a transformation is applied to one or more feature values and/or feature vectors.

In an embodiment, the vector dataset includes a plurality of timestamps associated with the feature vectors. Each of the timestamps indicates a time that a feature vector was generated. Each of the timestamps includes a time that a feature value was computed.

At step 650, an indication of at least one entity of the plurality of entities is received. The indication of the at least one entity may be received via the user interface. The indication of the at least one entity may be a query.

At step 660, at least one feature vector from the feature vector dataset is output. The feature vector is associated with the indicated entity. The feature vector is retrieved from the feature store.

According to an aspect, additional event data is received. The additional event data is stored to the related event store. Based on the timestamps of the events, the events stored to the related event store is replaced or updated. The additional event data is used to update feature values and/or update feature vectors. Based on the timestamps associated with the feature vectors, it may be determined that one or more of the feature values should be computed at new timestamps.

Based on the timestamps associated with the feature vectors, it may be determined that some features and not others should be used to compute updated feature values.

According to another aspect, a new configuration is received. The new configuration defines how to compute feature values. The new configuration is used instead of a previously received and/or used configuration. Based on the timestamps associated with the feature vectors, it is determined that new feature values need to be computed for at least a portion of the feature values. For example, new feature values must be computed for feature values having timestamps earlier than the time that the new configuration was received. Based on the timestamps, it may be determined that new feature values do not need to be computed for a portion of the feature values. For example, new feature values are not needed for feature values having timestamps later than the time that the new configuration was received.

The new configuration may ask for features that have not yet been computed. These new features are computed using the events in the related event store. The new features may be computed using events in the related event store having timestamps earlier than the time that the new configuration was received.

Figure 7:
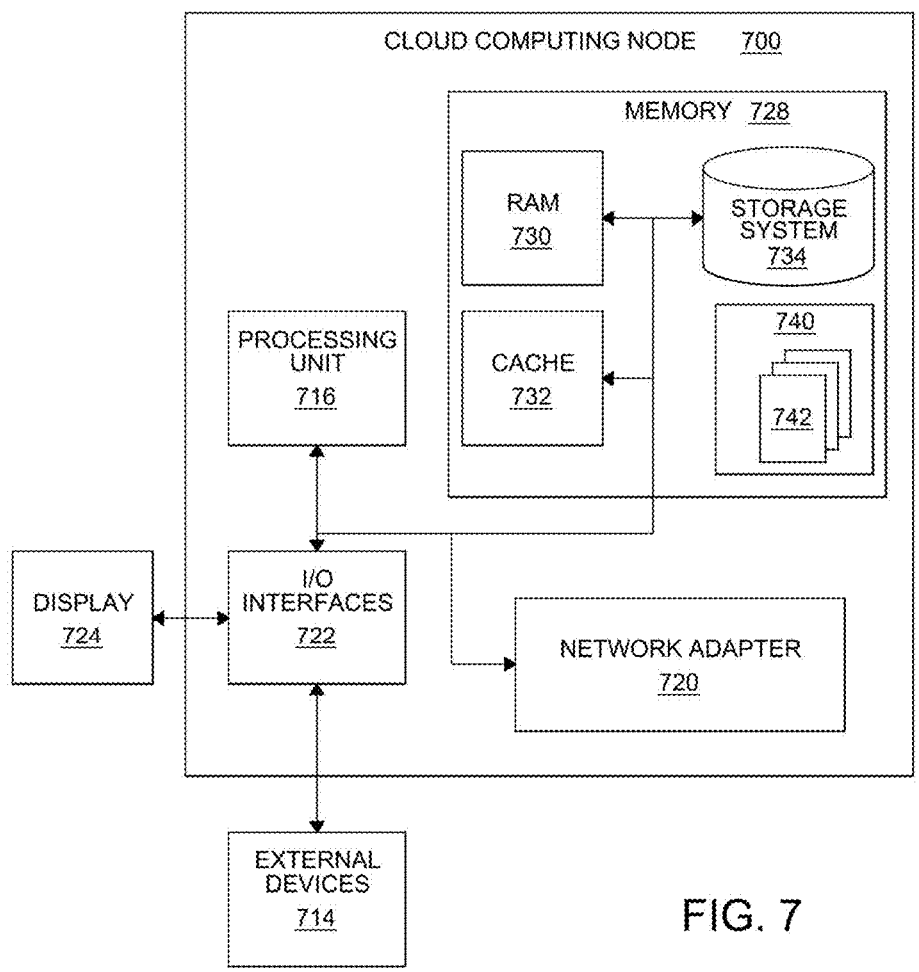
FIG. 7 shows an example computing node.

FIG. 7 shows an example computing node 700. Computing node 700 may be a component of feature engineering system 100 in FIG. 1 and/or feature engineering system 200 in FIG. 2. Computing node 700 may include feature engine 103 in FIG. 1 and/or feature engine 203 in FIG. 2 or a component thereof.

Computing node 700 may be a general-purpose computing device. Computing node 700 may be a node in a cloud computing environment. Computing node 700 may be an on-premises device, such as a node of a distributed system running in a users data center. The components of computing node 700 may include, but are not limited to, one or more processors or processing units 716, a system memory 728 and a bus 718 that couples various system components including system memory 728 to processor 716.

The bus 718 in the example of FIG. 7 represents one or more of any of several types of bus structures, including a memory bus or memory controller, a peripheral bus, an accelerated graphics port, and a processor or local bus using any of a variety of bus architectures. By way of example, and not limitation, such architectures include industry Standard Architecture ('ISA') bus, Micro Channel Architecture ('MCA') bus, Enhanced ISA ('EISA') bus, Video Electronics Standards Association ('VESA') local bus, and Peripheral Component Interconnects ('PCI') bus.

Computing node 700 may include a variety of computer system readable media. Such media may be any available media that is accessible by computing node 700, and it includes both volatile and non-volatile media, removable and non-removable media.

The system memory 728 in FIG. 7 may include computer system readable media in the form of volatile memory, such as random access memory ('RAM') 730 and/or cache memory 732. Computing node 700 may further include other removable/non-removable, volatile/non-volatile computer system storage media. By way of example only, a storage system 734 may be provided for reading from and writing to a non-removable, non-volatile magnetic media (not shown and typically called a "hard drive"). Although not shown, a magnetic disk drive for reading from and writing to a removable, non-volatile magnetic disk, e.g., a "floppy disk," and an optical disk drive for reading from or writing to a removable, non-volatile optical disk such as a CD-ROM, DVD-ROM or other optical media may be provided. In such instances, each may be connected to bus 718 by one or more data media interfaces. As will be further depicted and described below, memory 728 may include at least one program product having a set, e.g., at least one, of program modules that are configured to carry out the functions of embodiments of the invention.

Computing node 700 may include a program/utility 740 having a set (at least one) of program modules 742 that may be stored in memory 728. Computing node 700 of FIG. 7 may also include an operating system, one or more application programs, other program modules, and program data. Each of the operating system, one or more application programs, other program modules, and program data or some combination thereof, may include an implementation of a networking environment. Program modules 742 generally carry out the functions and/or methodologies of embodiments of the invention as described herein.

Computing node 700 of FIG. 7 may also communicate with one or more external devices 714 such as a keyboard, a pointing device, a display 724, and so on that enable a user to interact with computing node 710. Computing node 700 may also include any devices, e.g., network card, modem, etc., that enable computing node 700 to communicate with one or more other computing devices. Such communication may occur, for example, via I/O interfaces 722. Still yet, computing node 700 may communicate with one or more networks such as a local area network ('LAN'), a general wide area network ('WAN'), and/or a public network, e.g., the Internet, via network adapter 720. As depicted, network adapter 720 communicates with the other components of computing node 700 via bus 718. It should be understood that although not shown, other hardware and/or software components could be used in conjunction with computing node 700. Examples include, but are not limited to, microcode, device drivers, redundant processing units, external disk drive arrays, RAID systems, tape drives, and data archival storage systems, and so on.

Figure 8:
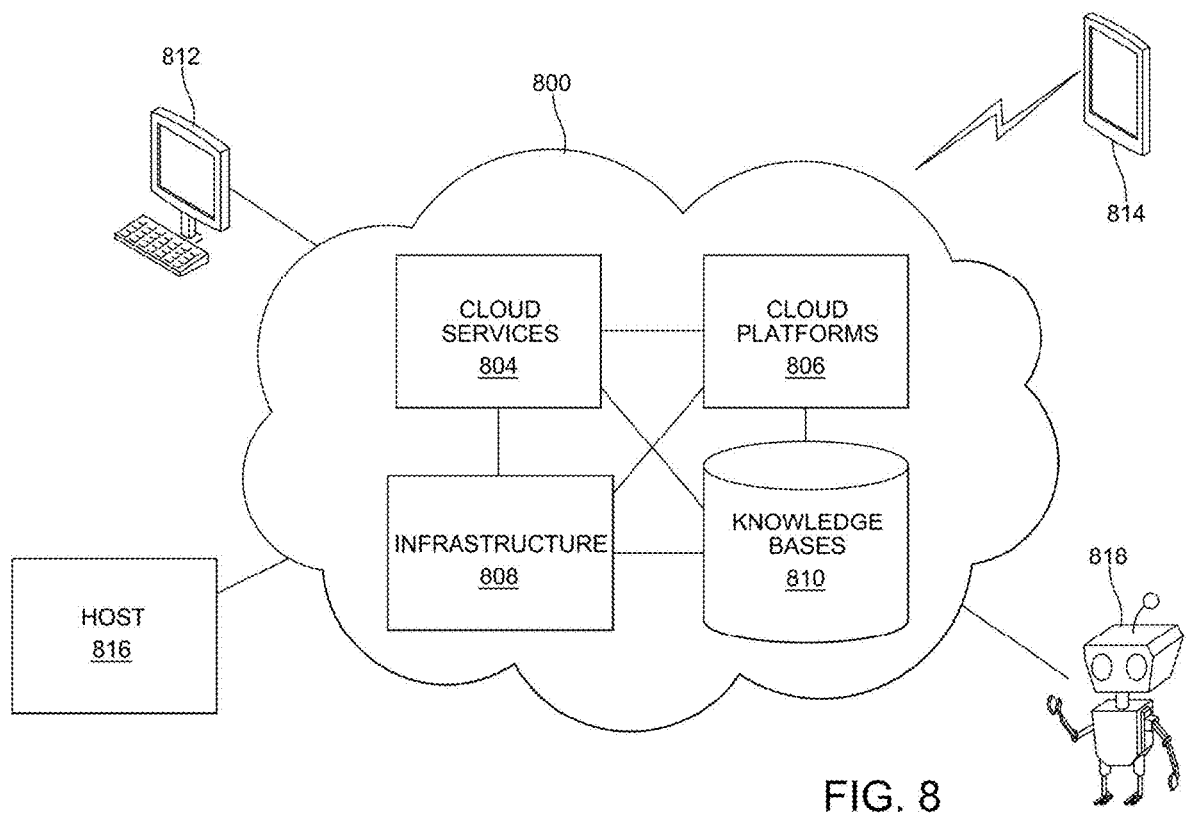
FIG. 8 shows an example cloud computing environment.

FIG. 8 shows example components of a cloud computing system 800. Cloud computing system 800 may include feature engineering system 100 in FIG. 1, feature engineering system 200 in FIG. 2, feature engine 103 in FIG. 1, and/or feature engine 203 in FIG. 2. Cloud computing system 800 may be used to perform any of the disclosed methods, such as method 600 in FIG. 6. Cloud-based computing generally refers to networked computer architectures where application execution, service provision, and data storage may be divided, to some extent, between clients and cloud computing devices. The "cloud" may refer to a service or a group of services accessible over a network, e.g., the Internet, by clients, server devices, and cloud computing systems, for example.

In one example, multiple computing devices connected to the cloud may access and use a common pool of computing power, services, applications, storage, and files. Thus, cloud computing enables a shared pool of configurable computing resources, e.g., networks, servers, storage, applications, and services, that may be provisioned and released with minimal management effort or interaction by the cloud service provider.

As an example, in contrast to a predominately client-based or server-based application, a cloud-based application may store copies of data and/or executable program code in the cloud computing system, while allowing client devices to download at least some of this data and program code as needed for execution at the client devices. In some examples, downloaded data and program code may be tailored to the capabilities of specific client devices, e.g., a personal computer, tablet computer, mobile phone, smartphone, and/or robot, accessing the cloud-based application. Additionally, dividing application execution and storage between client devices and the cloud computing system allows more processing to be performed by the cloud computing system, thereby taking advantage of the cloud computing system's processing power and capability, for example.

Cloud-based computing can also refer to distributed computing architectures where data and program code for cloud-based applications are shared between one or more client devices and/or cloud computing devices on a near real-time basis. Portions of this data and program code may be dynamically delivered, as needed or otherwise, to various clients accessing the cloud-based application. Details of the cloud-based computing architecture may be largely transparent to users of client devices. Thus, a PC user or a robot client device accessing a cloud-based application may not be aware that the PC or robot downloads program logic and/or data from the cloud computing system, or that the PC or robot offloads processing or storage functions to the cloud computing system, for example.

In FIG. 8, cloud computing system 800 includes one or more cloud services 804, one or more cloud platforms 806, cloud infrastructure 808 components, and cloud knowledge bases 810. Cloud computing system 800 may include more of fewer components, and each of cloud services 804, cloud platforms 806, cloud infrastructure components 808, and cloud knowledge bases 810 may include multiple computing and storage elements as well. Thus, one or more of the described functions of cloud computing system 800 may be divided into additional functional or physical components, or combined into fewer functional or physical components. In some further examples, additional functional and/or physical components may be added to the examples shown in FIG. 8. Delivery of cloud computing based services may involve multiple cloud components communicating with each other over application programming interfaces, such as web services and multi-tier architectures, for example.

Example cloud computing system 800 shown in FIG. 8 is a networked computing architecture. Cloud services 804 may represent queues for handling requests from client devices. Cloud platforms 806 may include client-interface frontends for cloud computing system 800. Cloud platforms 806 may be coupled to cloud services 804 to perform functions for interacting with client devices. Cloud platforms 806 may include applications for accessing cloud computing system 800 via user interfaces, such as a web browser and/or feature studio 215 in FIG. 2. Cloud platforms 806 may also include robot interfaces configured to exchange data with robot clients. Cloud infrastructure 808 may include service, billing, and other operational and infrastructure components of cloud computing system 800. Cloud knowledge bases 810 are configured to store data for use by cloud computing system 800, and thus, cloud knowledge bases 810 may be accessed by any of cloud services 804, cloud platforms 806, and/or cloud infrastructure components 808.

Many different types of client devices may be configured to communicate with components of cloud computing system 800 for the purpose of accessing data and executing applications provided by cloud computing system 800. For example, a computer 812, a mobile device 814, a host 816, and a robot client 818 are shown as examples of the types of client devices that may be configured to communicate with cloud computing system 800. Of course, more or fewer client devices may communicate with cloud computing system 800. In addition, other types of client devices may also be configured to communicate with cloud computing system 800 as well.

Computer 812 shown in FIG. 8 may be any type of computing device, e.g., PC, laptop computer, tablet computer, etc., and mobile device 814 may be any type of mobile computing device, e.g., laptop, smartphone, mobile telephone, cellular telephone, tablet computer, etc., configured to transmit and/or receive data to and/or from cloud computing system 800. Similarly, host 816 may be any type of computing device with a transmitter/receiver including a laptop computer, a mobile telephone, a smartphone, a tablet computer etc., which is configured to transmit/receive data to/from cloud computing system 800.

Any of the client devices used with cloud computing system 800 may include additional components. For example, the client devices one or more sensors, such as a digital camera or other type of image sensor. Other sensors may further include a gyroscope, accelerometer, Global Positioning System (GPS) receivers, infrared sensors, sonar, optical sensors, biosensors, Radio Frequency identification (RFID) systems, Near Field Communication (NFC) chip sensors, wireless sensors, and/or compasses, among others, for example.

Any of the client devices may also include a user-interface (UI) configured to allow a user to interact with the client device. The UI may be various buttons and/or a touchscreen interface configured to receive commands from a human or provide output information to a human. The UI may be a microphone configured to receive voice commands from a human.

In FIG. 8, communication links between client devices and cloud 800 may include wired connections, such as a serial or parallel bus, Ethernet, optical connections, or other type of wired connection. Communication links may also be wireless links, such as Bluetooth, IEEE 802.11 (IEEE 802.11 may refer to IEEE 802.11-2007, IEEE 802.11n-2009, or any other IEEE 802.11 revision), CDMA, 3G, GSM, WiMAX, or other wireless based data communication links.

In other examples, the client devices may be configured to communicate with cloud computing system 800 via wireless access points. Access points may take various forms. For example, an access point may take the form of a wireless access point (WAP) or wireless router. As another example, if a client device connects using a cellular air-interface protocol, such as CDMA, GSM, 3G, or 4G, an access point may be a base station in a cellular network that provides Internet connectivity via the cellular network.

As such, the client devices may include a wired or wireless network interface through which the client devices may connect to cloud computing system 800 directly or via access points. As an example, the client devices may be configured to use one or more protocols such as 802.11, 802.16 (WiMAX), LTE, GSM, GPRS, CDMA, EV-DO, and/or HSPDA, among others. Furthermore, the client devices may be configured to use multiple wired and/or wireless protocols, such as "3G" or "4G" data connectivity using a cellular communication protocol, e.g., CDMA, GSM, or WiMAX, as well as for "WiFi" connectivity using 802.11. Other types of communications interfaces and protocols could be used as well.

What is claimed is:
1. A method comprising:
 receiving, from a data source by a feature engine, a data stream indicating a plurality of events associated with a plurality of entities;

generating, by the feature engine, an event dataset comprising groups of the plurality of events associated with one or more entities of the plurality of entities wherein the event dataset comprises a plurality of timestamps associated with the plurality of events, wherein each of the plurality of timestamps comprises a time component;

receiving, an indication of one or more features associated with the plurality of entities and a configuration for determining the one or more features;

generating, using the configuration and the event dataset, a feature vector comprising the one or more features;

receiving, after generating the feature vector, additional event data;

determining, based on the plurality of timestamps, to replace at least a portion of the event dataset using the additional event data;

determining, based on the plurality of timestamps, to update a feature in the feature vector;

updating the feature of the generated feature vector using the corresponding feature of the generated feature vector, wherein the generated feature vector comprise a list of values of the one or more features and wherein updating the feature comprises updating a value in the list of values for the corresponding feature using the value and at least some of the additional event data; and outputting the updated feature as part of the feature vector associated with at least one entity.

2. The method of claim 1, further comprising:
determining an anchor time; and
computing the value in the list of values based on events that occurred over a first time frame that includes events that occurred prior to and after the anchor time and wherein only events in the first time frame that occurred prior to the anchor time are included in the value computation.

3. The method of claim 1, wherein each of the plurality of timestamps comprises:
a unique machine identifier; and
a sequence number.

4. The method of claim 1, wherein the feature vector dataset comprises a plurality of timestamps associated with the plurality of feature vectors, and wherein the method further comprises:
determining, based on the plurality of timestamps, a portion of the feature values to compute for different times.

5. The method of claim 1, wherein the data indicating the plurality of events comprises a stream of data indicating at least one of live events, events that occurred after a transmission delay, or historical events that were republished to the stream.

6. The method of claim 1, wherein the method further comprises storing definitions of the one or more features; and wherein generating the feature vector dataset comprises using the stored definitions.

7. A non-transitory computer-readable medium storing instructions that, when executed, cause operations comprising:
receiving, from one or more data sources by a feature engine, a data stream indicating a plurality of events associated with a plurality of entities wherein the event dataset comprises a plurality of timestamps associated with the plurality of events, wherein each of the plurality of timestamps comprises a time component;

generating, by the feature engine, an event dataset comprising groups of the plurality of events associated with one or more entities of the plurality of entities;

receiving, via an application programming interface (API), an indication of one or more features associated with the plurality of entities and a configuration for determining the one or more features;

generating, using the configuration and the event dataset, a feature vector associated with the plurality of entities, wherein the feature vector comprises a list of values of the one or more features;

receiving, after generating the feature vector, additional event data in the data stream indicating an additional plurality of events;

determining, based on the plurality of timestamps, to replace at least a portion of the event dataset using the additional event data;

updating, based on the plurality of timestamps, at least one feature in the generated feature vector by updating the at least one feature in the feature vector using the corresponding value for the feature in the list of values and at least some of the additional event data;

receiving, via the API, an indication of at least one entity of the plurality of entities; and outputting the updated at least one feature as part of the feature vector associated with the at least one entity.

8. The non-transitory computer-readable medium of claim 7, wherein the operations further comprise:
determining an anchor time; and
computing the value in the list of values based on events that occurred over a first time frame that includes events that occurred prior to and after the anchor time and wherein only events in the first time frame that occurred prior to the anchor time are included in the value computation.

9. The non-transitory computer-readable medium of claim 7, wherein each of the plurality of timestamps comprises:
a unique machine identifier; and
a sequence number.

10. The non-transitory computer-readable medium of claim 7, wherein the feature vector dataset comprises a plurality of timestamps associated with the plurality of feature vectors, and wherein the operations further comprise:
determining, based on the plurality of timestamps, a portion of the feature values to compute for different times.

11. The non-transitory computer-readable medium of claim 7, wherein the data indicating the plurality of events comprises a stream of data indicating at least one of live events, events that occurred after a transmission delay, or historical events that were republished to the stream.

12. The non-transitory computer-readable medium of claim 7, wherein the data indicating the plurality of events comprises at least one of stored historical events or one or more streams of data.

13. A feature engine comprising:
an event store configured to store an event dataset comprising groups of a plurality of events associated with one or more entities of a plurality of entities;
at least one processor;
a non-transitory computer-readable memory coupled to the at least one processor, the computer-readable memory having stored thereon computer readable instructions that upon execution on the at least one processor at least cause the feature engine to:

receive, from a data source, a stream of data indicating the plurality of events associated with the plurality of entities wherein the plurality of events comprise a timestamp associated with each of the plurality of events, wherein the timestamps comprises a time component;

generate, using the event dataset, a feature vector associated with the plurality of entities, wherein the feature vector comprises a list of values of one or more features;

receive, after generating the feature vector, an indication of an additional plurality of events in the stream of data;

determine, based on the plurality of timestamps, to replace at least a portion of the event dataset using the additional plurality of events;

updating, based on the timestamps, at least one feature in the feature vector by updating the at least on feature in the feature vector using the corresponding value for the feature in the list of values and at least some of the additional plurality of events;

receive an indication of at least one entity of the plurality of entities; and output the updated at least one feature as part of the feature vector associated with the at least one entity.

14. The feature engine of claim 13, wherein the feature engine is further configured to:
   determine an anchor time; and
   compute the value in the list of values based on events that occurred over a first time frame that includes events that occurred prior to and after the anchor time and wherein only events in the first time frame that occurred prior to the anchor time are included in the value computation.

15. The feature engine of claim 13, wherein the event dataset comprises a plurality of timestamps associated with the plurality of events, wherein each of the plurality of timestamps comprises:
   a unique machine identifier; and
   a sequence number.

16. The feature engine of claim 15, wherein the feature engine is further configured to:
   determining, based on the plurality of timestamps, a portion of the feature values to compute for different times.

17. The feature engine of claim 13, wherein the data indicating the plurality of events comprises at least one of a stream of data indicating at least one of live events, events that occurred after a transmission delay, or historical events that were republished to the stream.

\* \* \* \* \*